(12) United States Patent
Burhan

(10) Patent No.: US 9,143,279 B2
(45) Date of Patent: Sep. 22, 2015

(54) METHODS AND DEVICES FOR FACILITATING DATA RETRANSMISSIONS IN WIRELESS COMMUNICATION SYSTEMS

(71) Applicant: Qualcomm Incorporated, San Diego, CA (US)

(72) Inventor: Abeezar A. Burhan, Middlesex (GB)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 13/744,577

(22) Filed: Jan. 18, 2013

(65) Prior Publication Data

US 2014/0208179 A1    Jul. 24, 2014

(51) Int. Cl.
*G11C 29/00*   (2006.01)
*H04L 1/08*    (2006.01)
*H04L 1/16*    (2006.01)
*H04L 1/18*    (2006.01)

(52) U.S. Cl.
CPC .............. *H04L 1/08* (2013.01); *H04L 1/1883* (2013.01); *H04L 1/1887* (2013.01); *H04L 1/1614* (2013.01); *H04L 1/1877* (2013.01)

(58) Field of Classification Search
CPC ............ G06F 11/1068; G06F 11/1072; G06F 11/1076; G06F 29/00; G11C 29/00
USPC ......................................................... 714/773
See application file for complete search history.

(56) References Cited

U.S. PATENT DOCUMENTS

| | | | |
|---|---|---|---|
| 6,381,215 | B1  | 4/2002  | Hamilton et al. |
| 7,058,085 | B2  | 6/2006  | Earnshaw et al. |
| 7,684,329 | B2  | 3/2010  | Mohanty et al. |
| 7,734,980 | B2* | 6/2010  | Alexander et al. ............. 714/751 |
| 7,765,451 | B2  | 7/2010  | Yomo et al. |
| 7,773,524 | B2  | 8/2010  | Lim et al. |
| 7,839,834 | B2  | 11/2010 | Horn et al. |
| 7,913,148 | B2* | 3/2011  | Stolowitz ....................... 714/770 |
| 7,940,712 | B2  | 5/2011  | Larsson |
| 2002/0080792 | A1* | 6/2002 | Rosier ........................... 370/394 |
| 2003/0120811 | A1* | 6/2003 | Hanson et al. ................. 709/245 |

(Continued)

OTHER PUBLICATIONS

International Search Report and Written Opinion—PCT/US2014/010669—ISA/EPO—Apr. 23, 2014.

(Continued)

*Primary Examiner* — Albert Decady
*Assistant Examiner* — Enam Ahmed
(74) *Attorney, Agent, or Firm* — Loza & Loza LLP

(57) ABSTRACT

Wireless communications devices are adapted to perform retransmissions of data blocks. A wireless communications device can be adapted to transmit a plurality of data blocks to a receiving device. When the plurality of data blocks are transmitted, the wireless communications device can initiate a block timer associated with a round trip time for communications between the wireless communications device and the receiving device. When, prior to expiration of the block timer, a transmission is received with an indication that at least one data block was not successfully received, the wireless communications device can retransmit the unsuccessful data block. On retransmission, the block timer is restarted. If another transmission is received prior to expiration of the restarted block timer, the wireless communications device can ignore any indication of unsuccessful receipt associated with the retransmitted data block. Other aspects, embodiments, and features are also claimed and described.

16 Claims, 6 Drawing Sheets

(56) References Cited

U.S. PATENT DOCUMENTS

| | | | |
|---|---|---|---|
| 2004/0120292 A1* | 6/2004 | Trainin | 370/338 |
| 2004/0148396 A1 | 7/2004 | Meyer et al. | |
| 2008/0212520 A1 | 9/2008 | Chen et al. | |
| 2010/0054139 A1* | 3/2010 | Chun et al. | 370/252 |
| 2010/0205499 A1 | 8/2010 | Axelsson et al. | |
| 2011/0026625 A1* | 2/2011 | Susitaival et al. | 375/260 |
| 2011/0060974 A1* | 3/2011 | Viger et al. | 714/800 |
| 2012/0076095 A1 | 3/2012 | Zhang et al. | |
| 2012/0201151 A1 | 8/2012 | Kubota | |
| 2012/0324311 A1* | 12/2012 | Flynn et al. | 714/758 |

OTHER PUBLICATIONS

Nishida M., et al., "The design and implementation of data dissemination application using multicast over a satellite network", Applications and the Internet Workshops 2003. Proceedings. 2003 Symposium on Jan. 27-31, 2003, Piscataway, NJ, USA, IEEE, Jan. 27, 2003, XP010644157, pp. 50-55, ISBN: 978-0-7695-1873-2.

\* cited by examiner

METHODS AND DEVICES FOR FACILITATING DATA RETRANSMISSIONS IN WIRELESS COMMUNICATION SYSTEMS

TECHNICAL FIELD

The technology discussed in this patent application relates generally to wireless communication, and more specifically, to methods and devices for facilitating retransmission of data in wireless communication systems. Embodiments can be used to enable improved throughput performance in communication networks (e.g., GSMA-type networks).

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

As access terminals and network devices communicate over an air interface in a wireless communications system, data is typically divided into smaller packets (or data blocks). Data may also be encoded for transmission with an error detection code so that the receiver can detect erroneous or lost packets and thereby request retransmission. In various wireless communications systems, ACK/NACK messages are sent by the receiving device to the transmitting device to indicate whether there was an error in the transmission detected by the receiver. An acknowledgment (ACK) can indicate that the identified packet has been successfully received. A negative acknowledgment (NACK) can indicate an error in the transmission detected by the receiver. In response to a NACK message, the transmitter may retransmit the relevant packet(s).

BRIEF SUMMARY OF SOME EXAMPLES

Although ACK/NACK messaging is beneficial in many wireless communications systems, it may occur that conventional ACK/NACK messaging protocols can result in unnecessary delays and/or unnecessary retransmissions. It may therefore be beneficial to improve the retransmission procedures in wireless devices operating in a wireless communications system. Various examples of the present disclosure include devices and methods for facilitating transmission and retransmission of data by wireless devices. Indeed, by modifying conventional ACK/NACK protocols as discussed herein, network communications can be improved leading to improved throughput performance. As a result, embodiments of the technology discussed in this application can improve data communication speed and user experience.

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to at least one aspect of the present disclosure, wireless communications devices may include a communications interface and a storage medium each coupled with a processing circuit. The processing circuit may be adapted to transmit a plurality of data blocks via the communications interface. The processing circuit may initiate a block timer associated with a round trip time for each data block of the plurality of data blocks. A transmission may be received by the processing circuit via the communications interface, where the received transmission includes an indication that at least one data block of the plurality of data blocks has not been successfully received. The transmission may be received prior to expiration of the block timer. In response to the indication included in the received transmission, the processing circuit may retransmit each data block indicated to have not been successfully received. On retransmission of the unsuccessfully received data blocks, the processing circuit may restart the block timer. Another transmission may be received via the communications interface, where the other transmission includes an indication that one or more of the retransmitted data blocks have not been successfully received. If this indication is received before the block timer expires, the processing circuit may ignore the indication that one or more data blocks were not successfully received.

Further aspects of the present disclosure provide methods operational on a wireless communications device and/or wireless communications devices including means to perform such methods. One or more examples of such methods may include transmitting a plurality of data blocks, and initiating a block timer associated with a round trip time for each data block of the plurality of data blocks. A transmission may be received, where the transmission includes an indication that at least one data block of the plurality of data blocks has not been successfully received. This transmission may be received prior to expiration of the block timer. In response to this transmission received prior to expiration of the block timer, the each unsuccessful data block can be retransmitted. The block timer is restarted after retransmission of each unsuccessful data block. Another transmission may be received including an indication that one or more of the retransmitted data blocks have not been successfully received. If this indication is received before the block timer has expired, the indication can be ignored.

Still further aspects include computer-readable storage mediums comprising programming operational on a computer, such as a wireless communications device. According to one or more examples, such programming may be adapted for causing a computer to transmit a plurality of data blocks, and initiate a block timer associated with a round trip time for each data block of the plurality of data blocks. When a transmission is received prior to expiration of the block timer, and the transmission includes an indication that one or more data block has not been successfully received, the programming may be adapted for causing a computer to retransmit the one or more unsuccessful data blocks. The programming may further be adapted to cause a computer to restart the block timer on retransmission of each unsuccessful data block. When another transmission is received prior to expiration of the block timer, and the other transmission includes an indication that at least one data block has not been successfully received, the programming may be adapted for causing a computer to ignore the indication that the one or more data blocks were not successfully received.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the discussions are described below for 3rd Generation Partnership Project (3GPP) protocols and systems, and related terminology may be found in much of the following description. However, those of ordinary skill in the art will recognize that one or more aspects of the present disclosure may be employed and included in one or more other wireless communication protocols and systems.

Figure 1:
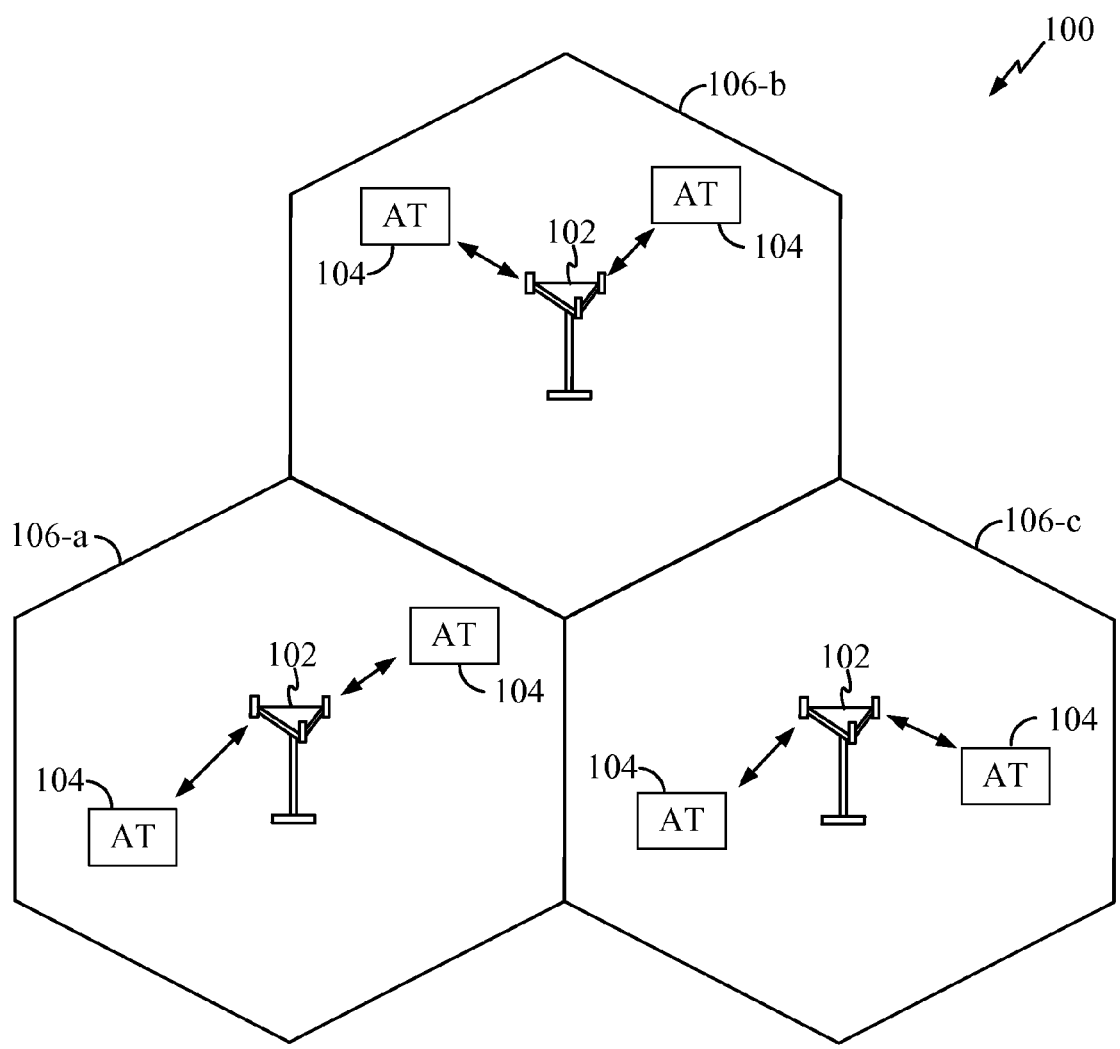
FIG. 1 is a block diagram illustrating an example of a network environment in which one or more aspects of the present disclosure may find application.

FIG. 1 is a block diagram of a network environment in which one or more aspects of the present disclosure may find application. The wireless communications system 100 is adapted to facilitate wireless communication between a plurality of wireless communication devices, including base stations 102 and access terminals 104. The wireless communication devices (e.g., the base stations 102 and access terminals 104) may be adapted to interact with one another through wireless signals. In some instances, wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). The system 100 may include base stations 102 of different types (e.g., macro, micro, and/or pico base stations).

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, an entertainment device, a digital video recorder (DVR), a machine-to-machine (M2M) device, and/or other communication/computing device which communicates, at least partially, through a wireless or cellular network.

Figure 2:
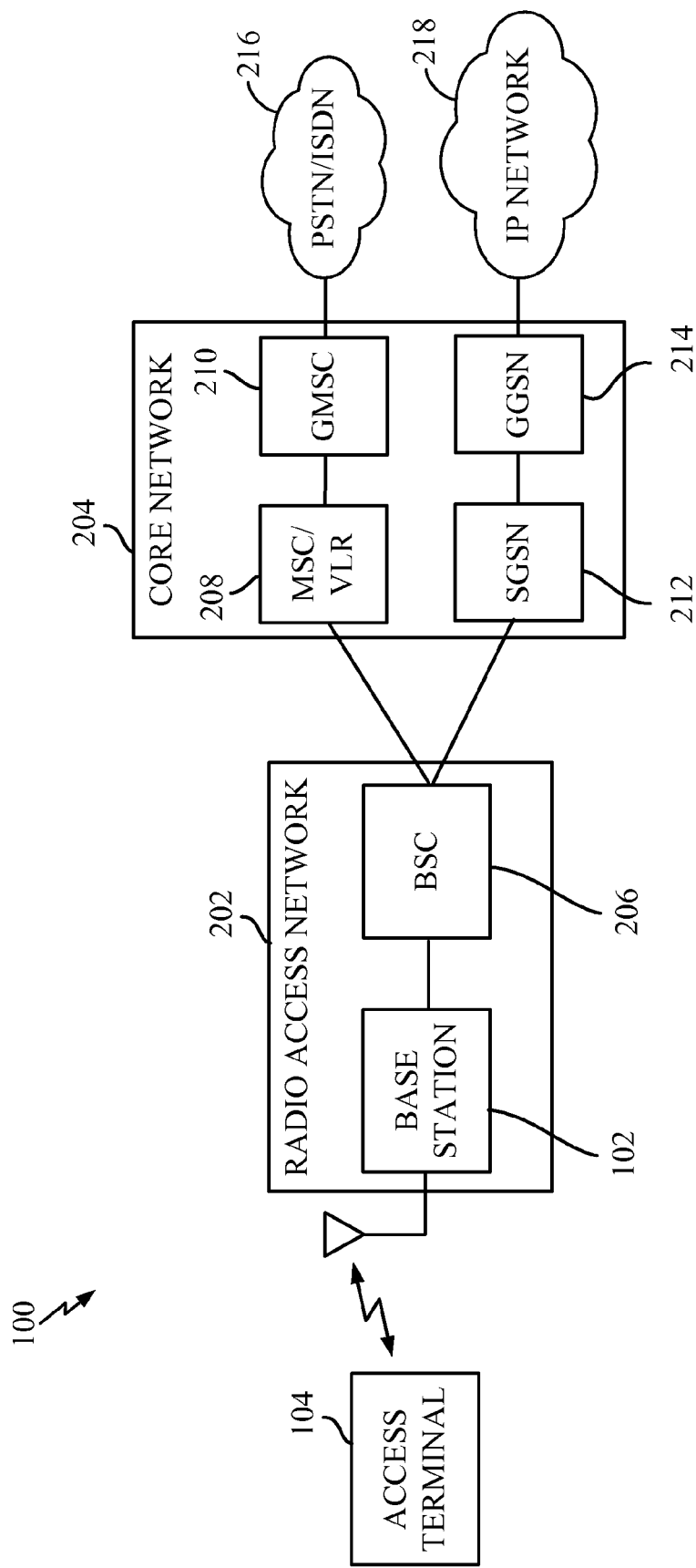
FIG. 2 is a block diagram illustrating select components of the wireless communication system of FIG. 1 according to some embodiments.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
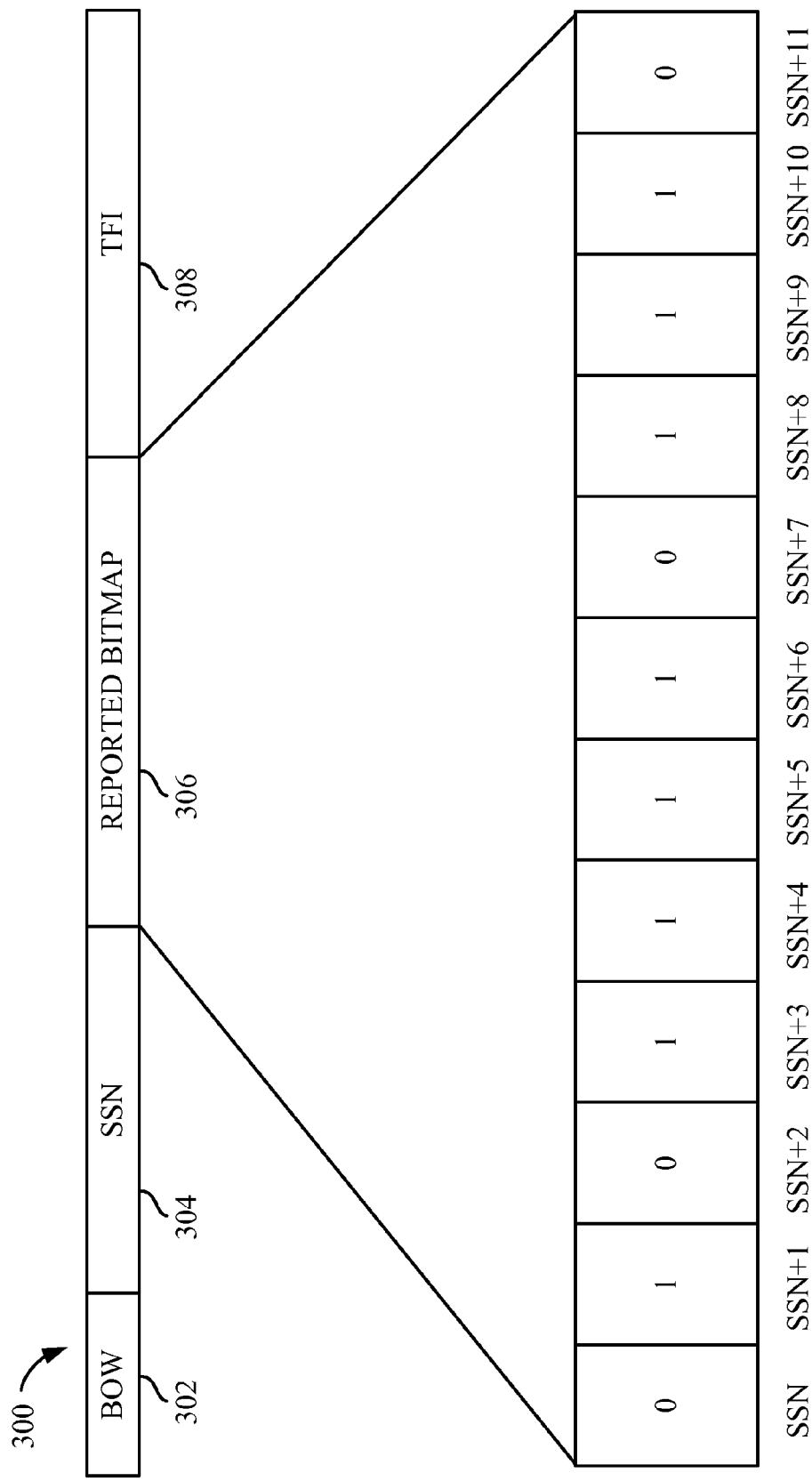
FIG. 3 is a block diagram illustrating at least one example of an ACK/NACK report according to some embodiments.

The wireless communications devices (e.g., base stations 102 and access terminals 104) may wirelessly communicate information by transmitting binary bits organized into data blocks over an air interface from one device to another. Within the framework of a wireless communications system 100 adapted to facilitate 3rd Generation Partnership Project (3GPP) protocols and systems, ACK/NACK messages are employed to indicate an error in the transmission detected by a receiving wireless communications device. According to the 3GPP standards document TS 44.060 release 11, the entire disclosure of which is incorporated herein by this reference, an ACK/NACK report can be sent from a receiving wireless communications device to a transmitting wireless communications device. Referring to FIG. 3, a block diagram is shown illustrating an ACK/NACK report 300 according to at least one example. The ACK/NACK report 300 may include various fields. These fields may include: a beginning-of-transmission window (BOW) field 302, a starting sequence number (SSN) field 304, a reported bitmap field 306, and a transmit format indicator field (TFI) 308.

Each of these fields may include various data. For example, the beginning-of-transmission window (BOW) field 302 indicates whether the beginning of the window (i.e., the blocks before the starting sequence number (SSN)) is covered by the ACK/NACK report 300. As another example, the SSN 304 includes a sequence number associated with the data block number for which the ACK/NACK report 300 starts. Also, the reported bitmap field 306 includes the actual ACK/NACK bits where each bit indicates an acknowledgment (ACK) or negative acknowledgment (NACK). In the illustrated example, the reported bitmap 306 includes 12 bits corresponding to the sequence numbers starting from the SSN through SSN+11. If, for example, the value in the SSN field 304 is 10, then the reported bitmap 306 would include a report for each of data block numbers 10 through 21. In the reported bitmap 306, a value of '0' for a particular bit indicates a NACK signifying that the data block associated with the particular bit was not successfully received and may be retransmitted by the transmitting device. A value of '1' for a particular bit in the reported bitmap 306 indicates an ACK signifying that the data block associated with the particular bit was successfully received. Other values may also be utilized to signify reception or non-reception.

The transmission of data blocks from a sender to a receiver, and ACK/NACK reports from the receiver to the sender takes a certain amount of time. This time period is often referred to as the round trip time (RTT). The round trip time (RTT) includes the time associated with the sender sending a data block, the receiver receiving the data block, the data block being processing to determine if it is correctly received, generating an ACK/NACK report message for that data block, transmitting the ACK/NACK report, and receiving the ACK/NACK report message at the sender. As a result of the round trip time (RTT), the sender may not know whether a sent data block arrived at the receiver before or after the ACK/NACK report was sent by the receiver.

An approach applied in 3GPP GERAN systems to overcome this issue includes the base station 102 informing the access terminal 104 of the current round trip time (RTT). The access terminal 104 can employ the reported round trip time (RTT) when calculating whether a specific bit in a reported bitmap 306 indicating and ACK or a NACK for a data block is valid or not. In current implementations of 3GPP GERAN systems, this estimated round trip time (RTT) is broadcast by the base station 102 to each access terminal 104 in a given cell 106 with the name "BS_CV_MAX." The sending device can start a timer with a duration defined at least in part by the BS_CV_MAX parameter when a data block is transmitted. If the sending device receives an ACK/NACK report message including an ACK/NACK for a data block for which the timer has not yet expired, the sending device is to ignore that report. That is, since the round trip time has not expired, it is likely that the ACK/NACK report message was sent before the data block arrived at the receiving device. In some instances, however, waiting for such a timer to expire before retransmitting a data block may increase latency and decrease throughput, while also causing real-time streaming applications to underperform in a wireless communications environment.

Figure 4:
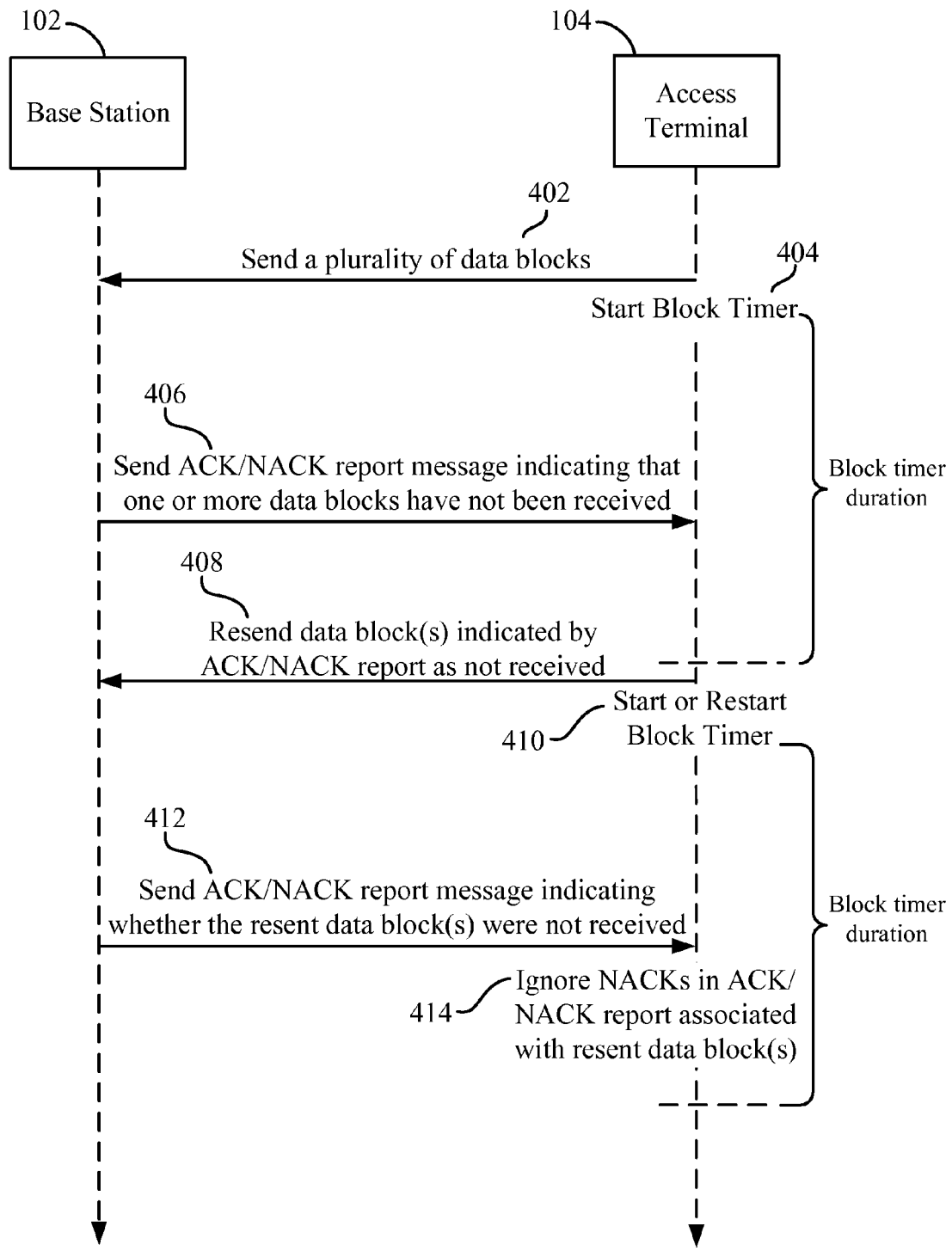
FIG. 4 is a flow diagram illustrating at least one example of select transmissions between a base station and access terminal and select operations on the access terminal according to some embodiments.

According to one or more aspects of the present disclosure, a wireless communications device can perform early retransmissions in response to a NACK message received following the first transmission of a radio block, even though a block timer associated with the round trip time (RTT) has not yet expired. FIG. 4 is a flow diagram illustrating interactions between a base station and an access terminal according to at least one example of the present disclosure. In the depicted example, a base station 102 and an access terminal 104 from FIGS. 1 and 2 are shown by way of example only. In this example, an access terminal 104 can wirelessly transmit a plurality of data blocks at 402. In addition to sending the plurality of data blocks, the access terminal 104 initiates a block timer 404 associated with the transmission of each data block. This block timer 404 can be associated with the round trip time (RTT), and may be at least partially defined by a BS_CV_MAX parameter received from the base station 102.

After receiving at least some of the plurality of data blocks, the base station 102 prepares and sends an ACK/NACK report message 406 adapted to indicate that one or more data blocks have not been successfully received. In the illustrated example, the access terminal 104 receives the ACK/NACK report message prior to expiration of the block timer. Instead of ignoring the ACK/NACK report message as a conventional access terminal would, the access terminal 104 resends the data blocks 408 which the ACK/NACK report message indicated had not been successfully received (e.g., the data blocks associated with a NACK in the ACK/NACK report).

According to at least one aspect, wireless communications devices of the present disclosure can, for each retransmission, employ the block timer to determine whether to ignore any subsequent ACK/NACK report for a retransmitted data block for which the block timer has not yet expired. For instance, in addition to resending the data blocks 408 which the ACK/NACK report message indicated had not been successfully received, the access terminal 104 also starts the block timer 410 (or restarts the block timer if the block timer has not yet expired) for those data blocks that were retransmitted.

The base station 102 may send an ACK/NACK report message 412 associated with the resent data blocks. In some instances, this ACK/NACK report message associated with the resent data blocks may be received by the access terminal 104 prior to expiration of the block timer. In such instances, there is uncertainty whether the received ACK/NACK report message was sent by the base station 102 before reception of the retransmitted data block(s) by the base station 102. The access terminal 104 can accordingly be adapted to ignore 414 any indicated NACKs in the ACK/NACK report associated with the retransmitted data block(s), when the ACK/NACK report message is received before the block timer has expired. The access terminal 104 can, however, process any indicated ACKs in the ACK/NACK report associated with the retransmitted data block(s).

Figure 5:
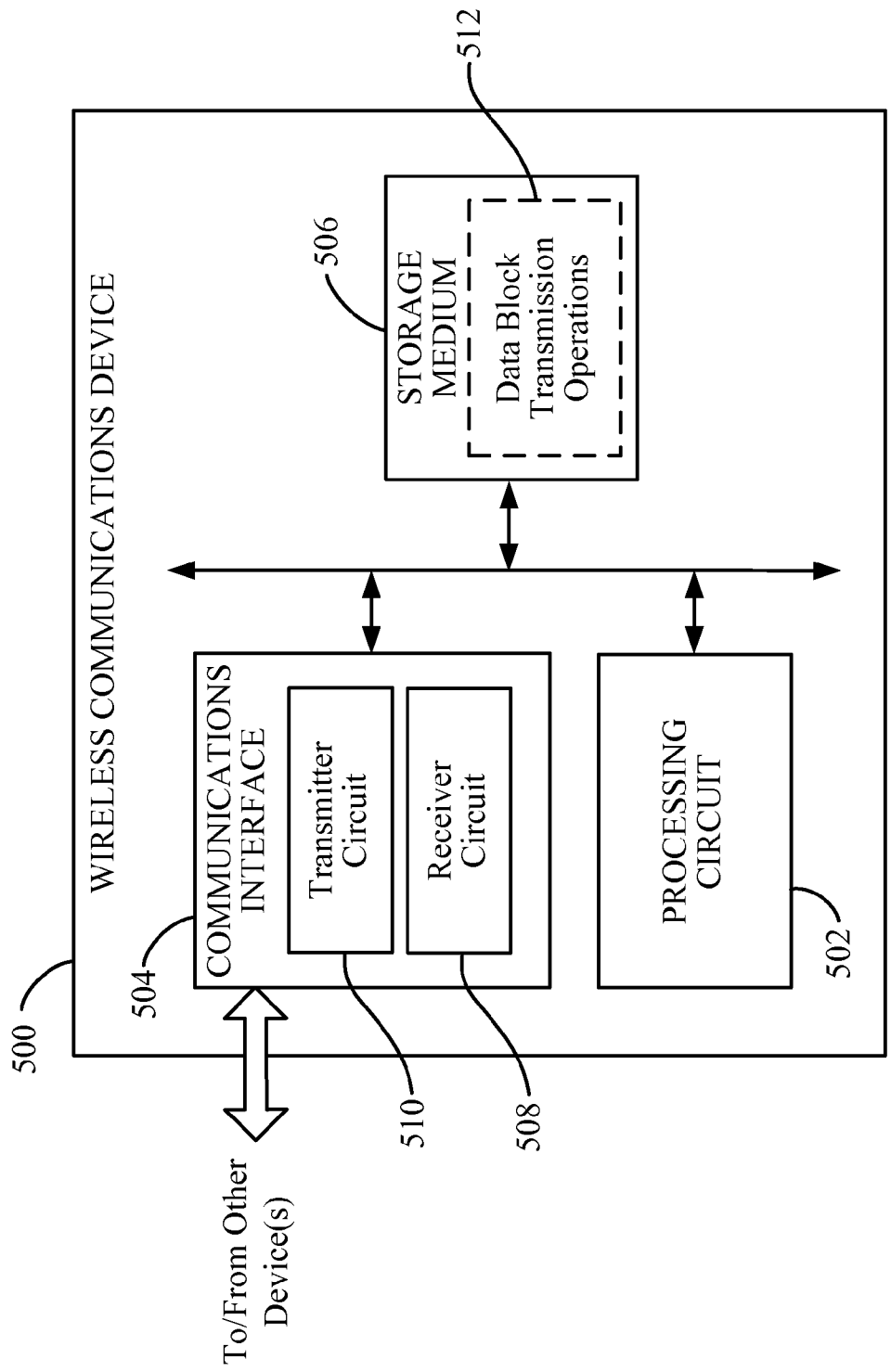
FIG. 5 is a block diagram illustrating select components of a wireless communications device according to some embodiments.

Turning to FIG. 5, a block diagram is shown illustrating select components of a wireless communications device 500 according to at least one example of the present disclosure. Such a wireless communications device 500 may be implemented, for example as one or more of the wireless communications devices described above with reference to FIGS. 1 and 2. The wireless communications device 500 includes a processing circuit 502 coupled to or placed in electrical communication with a communications interface 504 and a storage medium 506.

The processing circuit 502 is arranged to obtain, process and/or send data, control data access and storage, issue commands, and control other desired operations. The processing circuit 502 may include circuitry adapted to implement desired programming provided by appropriate media in at least one example. For example, the processing circuit 502 may be implemented as one or more processors, one or more controllers, and/or other structure configured to execute executable programming. Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is adapted for processing, including the execution of programming, which may be stored on the storage medium 506. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 504 is configured to facilitate wireless communications of the wireless communications device 500. For example, the communications interface 504 may include circuitry and/or programming adapted to facilitate the communication of information bi-directionally with respect to one or more other wireless communications devices. The communications interface 504 may be coupled to one or more antennas (not shown), and includes wireless transceiver circuitry, including at least one receiver circuit 508 (e.g., one or more receiver chains) and/or at least one transmitter circuit 510 (e.g., one or more transmitter chains).

The storage medium 506 may represent one or more computer-readable, machine-readable, and/or processor-readable devices for storing programming, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor, including portable or fixed storage devices, optical storage devices, and various other mediums capable of storing, containing and/or carrying programming. By way of example and not limitation, the storage medium 506 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the wireless communications device 500, external to the wireless communications device 500, and/or distributed across multiple entities).

Programming stored by the storage medium 506, when executed by the processing circuit 502, causes the processing circuit 502 to perform one or more of the various functions and/or process steps described herein. For example, the storage medium 506 may include data block transmission operations 512. The data block transmission operations 512 can be implemented by the processing circuit 502 to perform and/or manage data block transmissions, block timers, and/or data block retransmissions. Thus, according to one or more aspects of the present disclosure, the processing circuit 502 is adapted to perform (in conjunction with the storage medium 506) any or all of the processes, functions, steps and/or routines for any or all of the wireless communications devices described herein (e.g., base station 102, access terminal 104, wireless communications device 500). As used herein, the term "adapted" in relation to the processing circuit 502 may refer to the processing circuit 502 being one or more of configured, employed, implemented, and/or programmed (in conjunction with the storage medium 506) to perform a particular process, function, step and/or routine according to various features described herein.

Figure 6:
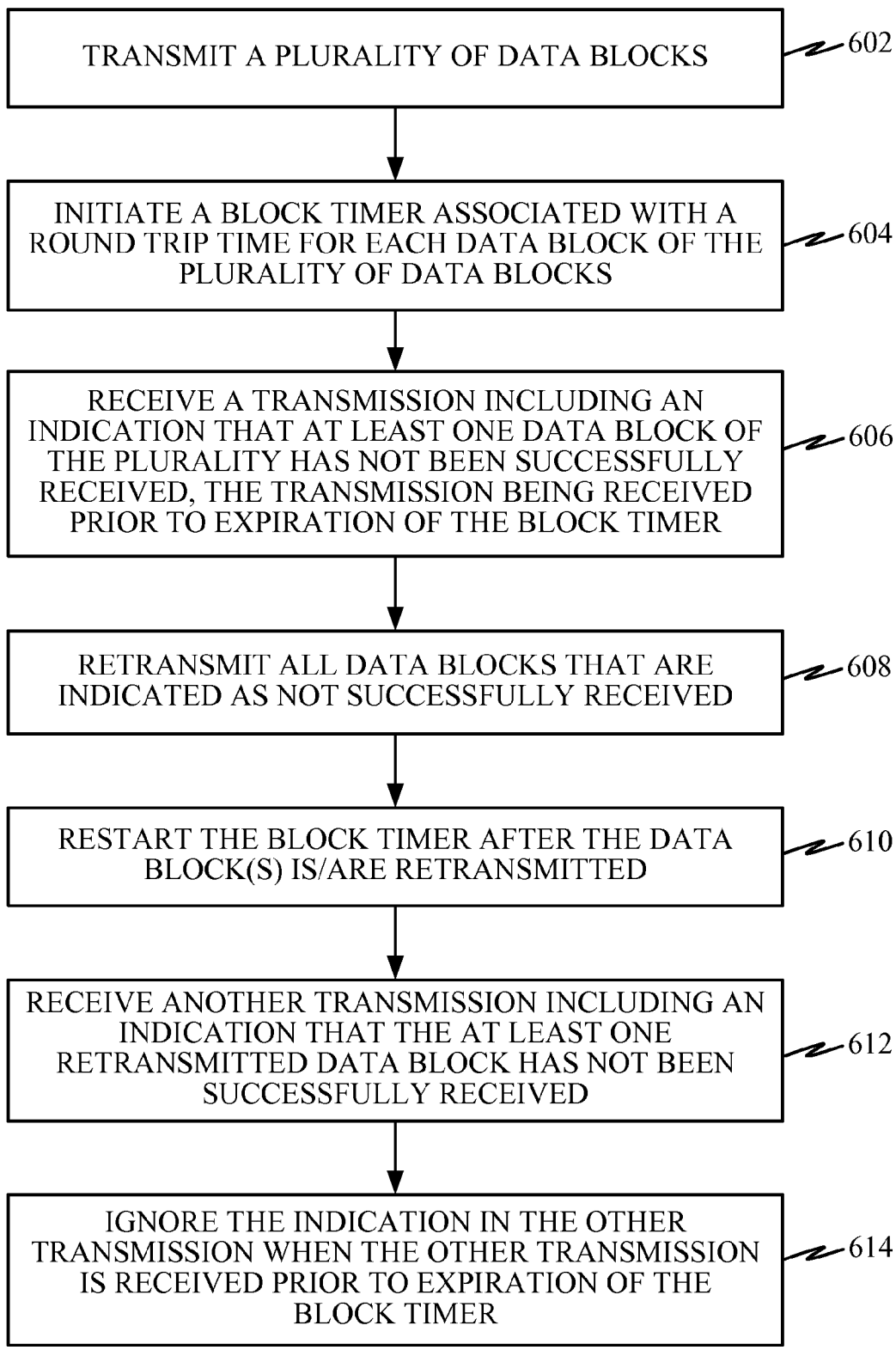
FIG. 6 is a flow diagram illustrating a method operational on a wireless communications device according to some embodiments.

FIG. 6 is a flow diagram illustrating a method operational on a wireless communications device, such as the wireless communications device 500, according to at least one example. Referring to FIGS. 5 and 6, a wireless communications device 500 may transmit a plurality of data blocks at step 602. For example, the processing circuit 502 may prepare and transmit a plurality of data blocks (e.g., RLC data blocks) via the communications interface 504.

At step 604, the wireless communications device 500 initiates a block timer when the plurality of data blocks are transmitted. For example, the processing circuit 502 executing the data block transmission operations 512 can initiate a block timer associated with each data block when each data block is transmitted or when a group of data blocks are transmitted. The block timer is associated with a round trip time (RTT). In at least some examples, the block timer can be defined at least in part by a parameter named the BS_CV_MAX parameter in 3GPP GERAN communication systems. The processing circuit 502 executing the data block transmission operations 512 can accordingly initiate a count-down timer set to a value defined by the BS_CV_MAX parameter associated with the round trip time for the wireless communications involving the wireless communications device 500.

At step 606, the wireless communications device 500 may receive a transmission which includes an indication that one or more data blocks of the plurality of transmitted data blocks were not successfully received. For example, the processing circuit 502 executing the data block transmission operations 512 can receive the transmission via the communications interface 506. In some instances, the transmission can be received prior to expiration of the block timer. The received transmission may be an ACK/NACK report including a NACK indicator for each of the one or more data blocks that were not successfully received. The ACK/NACK report may be similar to the ACK/NACK report 300 described above with reference to FIG. 3, including a reported bitmap (e.g., the reported bitmap 306 in FIG. 3) with a plurality of bits. The one or more bits of the reported bitmap which are associated with the one or more data blocks that were not successfully received include a NACK value.

At step 608, the wireless communications device 500 retransmits the one or more data blocks indicated in the received transmission to have not been successfully received. For example, the processing circuit 502 executing the data block transmission operations 512 can retransmit the one or more data block via the communications interface. In the present example, this retransmission occurs irrespective of the status of the block timer when the transmission was received at step 606. That is, the one or more data blocks can be retransmitted even though the block timer may not have expired when the transmission was received.

When the one or more data blocks are retransmitted, the wireless communications device 500 can restart the block timer at step 610. For instance, the processing circuit 502 executing the data block transmission operations 512 can initiate the block timer for the one or more retransmitted data blocks.

At step 612, the wireless communications device 500 may receive another transmission with an indication that one or more of the retransmitted data blocks were not successfully received. For example, the processing circuit 502 executing the data block transmission operations 512 can receive the other transmission via the communications interface 506. Like the transmission received at step 606, this other transmission may be an ACK/NACK report similar to the ACK/NACK report 300 described above with reference to FIG. 3, including a reported bitmap (e.g., the reported bitmap 306 in FIG. 3) with a plurality of bits. The ACK/NACK report includes a NACK indicator for one or more of the retransmitted data blocks In some instances, the other transmission can be received by the wireless communications device 500 before the block timer expires. When this occurs, the wireless communications device 500 can ignore any indication that the one or more retransmitted data blocks were not successfully received at step 614. In such instances, the wireless communications device 500 is uncertain whether the received ACK/NACK report message was sent by the receiver device before or after the retransmitted data block(s) were actually received. In at least one example, the processing circuit 502 executing the data block transmission operations 512 may ignore the indication of that one or more of the retransmitted data blocks were not successfully received when the other transmission is received prior to expiration of the block timer. For instance, when the other transmission is received at step 612, the processing circuit 502 executing the data block transmission operations 512 can check the status of the block timer. If the block timer has not yet expired, the processing circuit 502 executing the data block transmission operations 512 can ignore any NACK indicators associated with the one or more retransmitted data blocks. On the other hand, if the block timer has expired, the processing circuit 502 executing the data block transmission operations 512 can process the NACK indicators to determine which of the one or more retransmitted data blocks are to be retransmitted again.

For one or more implementations, the processing circuit 502 executing the data block transmission operations 512 can continue to ignore a negative indicator (e.g., NACK) for each retransmitted data block whenever the negative indicator is received prior to expiration of the current block timer. In other words, the processing circuit 502 executing the data block transmission operations 512 can ignore the block timer for negative indicators following the first transmission of the data blocks, but can employ the block timer for ignoring negative indicators for each subsequent retransmission of a data block.

While the above discussed aspects, arrangements, and embodiments are discussed with specific details and particularity, one or more of the components, steps, features and/or functions illustrated in FIGS. 1, 2, 3, 4, 5 and/or 6 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2 and/or 5 may be configured to perform or employ one or more of the methods, features, parameters, and/or steps described in FIGS. 3, 4 and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communications device, comprising:
   a communications interface;
   a storage medium; and
   a processing circuit coupled to the communications interface and the storage medium, the processing circuit adapted to:
   transmit a plurality of data blocks via the communications interface;
   initiate a block timer associated with a round trip time for each data block of the plurality of data blocks in response to transmission of the plurality of data blocks;
   receive a first transmission via the communications interface, the received first transmission including a first indication that at least one data block of the plurality of data blocks has not been successfully received, wherein the first transmission is received prior to expiration of the block timer;
   retransmit the at least one data block via the communications interface in response to the first indication that the at least one data block of the plurality of data blocks has not been successfully received;
   restart the block timer in response to retransmission of the at least one data block;
   receive a second transmission via the communications interface, the second received transmission including a second indication that the at least one retransmitted data block has not been successfully received, wherein the second transmission is received prior to expiration of the restarted block timer; and
   ignore the second indication that the at least one retransmitted data block has not been successfully received in response to the second indication being received prior to expiration of the restarted block timer.

2. The access terminal of claim 1, wherein the block timer associated with a round trip time is defined at least in part by a BS_CV_MAX parameter.

3. The access terminal of claim 1, wherein the first indication that at least one data block of the plurality of data blocks has not been successfully received comprises:
   an ACK/NACK report including a NACK indicator for the at least one data block that has not been successfully received.

4. The access terminal of claim 3, wherein the ACK/NACK report including a NACK indicator for the at least one data block that has not been successfully received comprises:
   a reported bitmap including a plurality of bits, wherein a bit associated with the at least one data block includes a NACK value.

5. A method operational on a wireless communications device, comprising:
   transmitting a plurality of data blocks;
   initiating a block timer associated with a round trip time for each data block of the plurality of data blocks;
   receiving a first transmission including a first indication that at least one data block of the plurality of data blocks has not been successfully received, wherein the first transmission is received prior to expiration of the block timer;
   retransmitting the at least one data block in response to the first indication that the at least one data block of the plurality of data blocks has not been successfully received;
   restarting the block timer after the at least one data block is retransmitted;
   receiving a second transmission including a second indication that the at least one retransmitted data block has not been successfully received; and
   ignoring the second indication that the at least one retransmitted data block has not been successfully received when the second transmission is received prior to expiration of the restarted block timer.

6. The method of claim 5, wherein initiating the block timer associated with a round trip time comprises:
   initiating a block timer defined at least in part by a BS_CV_MAX parameter.

7. The method of claim 5, wherein receiving the first transmission including the first indication that at least one data block of the plurality of data blocks has not been successfully received comprises:
   receiving an ACK/NACK report including a NACK indicator for the at least one data block that has not been successfully received.

8. The method of claim 7, wherein receiving the ACK/NACK report including the NACK indicator for the at least one data block that has not been successfully received comprises:
   receiving a reported bitmap including a plurality of bits, wherein a bit associated with the at least one data block includes a NACK value.

9. An access terminal, comprising:
   means for transmitting a plurality of data blocks;
   means for initiating a block timer associated with a round trip time for each data block of the plurality of data blocks;
   means for receiving a first transmission including a first indication that at least one data block of the plurality of data blocks has not been successfully received, wherein the transmission is received prior to expiration of the block timer; and
   means for retransmitting the at least one data block in response to the first indication that the at least one data block of the plurality of data blocks has not been successfully received;

means for restarting the block timer after the at least one data block is retransmitted;

means for receiving a second transmission including a second indication that the at least one retransmitted data block has not been successfully received; and means for ignoring the second indication in the second transmission that the at least one retransmitted data block has not been successfully received when the second transmission is received prior to expiration of the restarted block timer.

10. The access terminal of claim 9, wherein the block timer associated with the round trip time is defined at least in part by a BS_CV_MAX parameter.

11. The access terminal of claim 9, wherein the first indication that at least one data block of the plurality of data blocks has not been successfully received comprises:

an ACK/NACK report including a NACK indicator for the at least one data block that has not been successfully received.

12. The access terminal of claim 11, wherein the ACK/NACK report including the NACK indicator for the at least one data block that has not been successfully received comprises:

a reported bitmap including a plurality of bits, wherein a bit associated with the at least one data block includes a NACK value.

13. A non-transitory computer-readable storage medium, comprising programming for causing a computer to:

transmit a plurality of data blocks;

initiate a block timer associated with a round trip time for each data block of the plurality of data blocks in response to transmission of the plurality of data blocks;

receive a first transmission including first indication that at least one data block of the plurality of data blocks has not been successfully received, wherein the first transmission is received prior to expiration of the block timer;

retransmit the at least one data block in response to the first indication that the at least one data block of the plurality of data blocks has not been successfully received;

restart the block timer in response to retransmission of the at least one data block;

receive a second transmission including a second indication that the at least one retransmitted data block has not been successfully received, wherein the second transmission is received prior to expiration of the restarted block timer; and ignore the second indication that the at least one retransmitted data block has not been successfully received in response to the second indication being received prior to expiration of the restarted block timer.

14. The computer-readable storage medium of claim 13, wherein the block timer associated with a round trip time is defined at least in part by a BS_CV_MAX parameter.

15. The computer-readable storage medium of claim 13, wherein the first indication that at least one data block of the plurality of data blocks has not been successfully received comprises:

an ACK/NACK report including a NACK indicator for the at least one data block that has not been successfully received.

16. The computer-readable storage medium of claim 15, wherein the ACK/NACK report including a NACK indicator for the at least one data block that has not been successfully received comprises:

a reported bitmap including a plurality of bits, wherein a bit associated with the at least one data block includes a NACK value.

* * * * *